US007389846B2

(12) United States Patent
Grywacheski et al.

(10) Patent No.: US 7,389,846 B2
(45) Date of Patent: Jun. 24, 2008

(54) PERSONAL ALL TERRAIN VEHICLE

(75) Inventors: Stanley Lawrence Grywacheski, East St. Paul (CA); Rene Raymond Rosset, Winnipeg (CA); John Laurence Enns, La Salle (CA)

(73) Assignee: Louis Tolaini, Winnipeg, CA (US)

( * ) Notice: Subject to any disclaimer, the term of this patent is extended or adjusted under 35 U.S.C. 154(b) by 504 days.

(21) Appl. No.: 10/780,885

(22) Filed: Feb. 19, 2004

(65) Prior Publication Data
US 2004/0216944 A1 Nov. 4, 2004

Related U.S. Application Data

(60) Provisional application No. 60/447,725, filed on Feb. 19, 2003.

(51) Int. Cl.
*B60K 26/00* (2006.01)

(52) U.S. Cl. .................. 180/326; 180/329; 180/330; 180/9; 180/9.21

(58) Field of Classification Search .............. 280/406.2, 280/416.2; 180/9, 9.21, 9.4, 326, 329, 330
See application file for complete search history.

(56) References Cited

U.S. PATENT DOCUMENTS

| | | | | |
|---|---|---|---|---|
| 2,261,354 A | | 11/1941 | Fee | |
| 2,583,358 A | | 1/1952 | Cesan | |
| 2,721,077 A | | 10/1955 | Van der Lely | |
| 2,831,544 A | * | 4/1958 | Dunn et al. | 180/9.23 |
| 3,455,404 A | | 7/1969 | Hansen | |
| 3,603,064 A | * | 9/1971 | Pinkham | 56/27.5 |
| 3,614,120 A | | 10/1971 | Cicero | |
| 3,910,368 A | | 10/1975 | eber et al. | |
| 4,169,511 A | * | 10/1979 | Brown | 180/212 |
| 4,373,856 A | * | 2/1983 | Taylor | 414/470 |
| 4,460,064 A | * | 7/1984 | Lutz et al. | 187/222 |
| 4,526,248 A | | 7/1985 | Johansen | |
| 4,869,337 A | * | 9/1989 | Wagner | 180/330 |
| 4,971,510 A | * | 11/1990 | Houle | 414/546 |
| 5,176,573 A | * | 1/1993 | Dow | 460/42 |
| 5,303,792 A | * | 4/1994 | Shimizu | 180/89.17 |
| 5,454,444 A | | 10/1995 | Tayloer et al. | |
| 5,513,868 A | * | 5/1996 | Barr | 280/400 |
| 5,730,236 A | * | 3/1998 | Miller et al. | 180/65.1 |
| 5,732,788 A | * | 3/1998 | Brown | 180/326 |
| 6,470,874 B1 | * | 10/2002 | Mertes | 125/12 |

* cited by examiner

*Primary Examiner*—Toan To
(74) *Attorney, Agent, or Firm*—Ryan W. Dupuis; Adrian D. Battison; Michael R. Williams

(57) ABSTRACT

A personal all-terrain vehicle is provided which is suitable for driving between rows of a vineyard for trimming vines. The vehicle includes a frame and an engine. A driver seat of the vehicle is positioned at an end of the frame beyond the wheels of the vehicle in the longitudinal direction of the vehicle facing perpendicularly to the longitudinal direction of the vehicle. Drive controls are foot and leg so that the operator's hands are free for performing work. A hitch member is supported at a rear end of the vehicle adjacent the seat for towing a cart including a tub for carrying trimmings therein. A chipper unit on the cart shreds the vine trimmings into smaller particulates.

20 Claims, 7 Drawing Sheets

PERSONAL ALL TERRAIN VEHICLE

This application claims the benefit under 35 U.S.C.119(e) of U.S. provisional application Ser. No. 60/447,725, filed Feb. 19, 2003.

FIELD OF THE INVENTION

The present invention relates to a personal all terrain vehicle and more particularly to a vehicle for use in agriculture and related fields to position an operator of the vehicle close to the ground for handling low lying vegetation.

BACKGROUND

Various types of low lying vegetation require care in the form of pruning, trimming, weeding or picking which represents a considerable backbreaking chore when large fields are to be managed. In the instance of pruning grape vines, the conventional method of pruning is to walk along the plant rows and prune the vines at approximately fifteen inches off the ground. The worker will stand bent over or kneel down at each plant to prune. This task is often carried out on steep hillsides and as a result productivity is low and workers suffer from back and leg strain.

U.S. Pat. No. 3,455,404 to Hansen, U.S. Pat. No. 2,583,358 to Cesan, U.S. Pat. No. 4,526,248 to Johansen and U.S. Pat. No. 3,614,120 to Cicero disclose variations to carts for supporting a worker thereon, and in particular for supporting a worker low to the ground for working on low lying vegetation. None of these vehicles however are suited for use on steep hillsides and in general, the operator is seated centrally on the vehicle which permits the vehicle to become easily hung up on rough terrain while limiting reach of the operator to handle vegetation on the ground. Furthermore the seat is not suitably oriented to position the operator for handling vegetation situated alongside a direction of travel of the vehicle with hands-free operation of the vehicle.

SUMMARY

According to one aspect of the present invention there is provided a personal all-terrain vehicle comprising:
a frame supported for rolling movement along the ground on respective wheels;
an engine for driving the wheels to displace the vehicle in a longitudinal direction of the vehicle; and
a driver seat supported on the frame for supporting a driver of the vehicle thereon;
the driver seat being positioned at an end of the frame beyond the wheels of the vehicle in the longitudinal direction of the vehicle.

According to a second aspect of the present invention there is provided a personal all-terrain vehicle comprising:
a frame supported for rolling movement along the ground on respective wheels;
an engine for driving the wheels to displace the vehicle in a longitudinal direction of the vehicle; and
a driver seat supported on the frame for supporting a driver of the vehicle thereon;
the drive seat facing transversely to the longitudinal direction of the vehicle.

According to a third aspect of the present invention there is provided a personal all-terrain vehicle comprising:
a frame supported for rolling movement along the ground on respective wheels;
an engine for driving the wheels to displace the vehicle in a longitudinal direction of the vehicle;
a driver seat supported on the frame for supporting a driver of the vehicle thereon; and
a drive actuator controlling drive of the vehicle in the longitudinal direction, the drive actuator being positioned adjacent the drive seat for suitable actuation by a leg of the driver.

The use of an all terrain vehicle for supporting a worker thereon permits the vehicle to be used in varied types of terrain, including steep hillsides of typical vineyards. By positioning the seat towards one end of the vehicle beyond the wheels of the vehicle, larger all terrain wheels or track configurations are permitted while still positioning the seat close to the ground for handling low lying vegetation. The seat may also be supported transversely to the forward direction so that the driver is properly positioned for handling vegetation alongside the direction of travel of the vehicle. The addition of leg operated drive controls further permits hands-free operation to increase productivity of the worker. When the seat is positioned low to the ground at one end of the vehicle, permitting deflection of the seat relative to the vehicle frame eliminates the problem of the seat jamming into the ground and possibly causing the vehicle frame to be hung up on rough terrain. The use of tracks with large all terrain wheels ensures that the vehicle can be used in many adverse conditions and on steep rocky slopes regardless of loose mud, loose sand, frozen ground or snow covered ground.

The vehicle may comprise a tracked vehicle in which there is provided a track extending about respective ones of the wheels on each side of the frame.

The seat preferably includes a deck below a seating surface of the seat for supporting feet of the driver thereon in which the deck is positioned below a height of the tracks.

The seat may be supported directly in behind the wheels, in alignment in the longitudinal direction with the wheels.

The drive seat may be oriented to faces laterally outward, substantially perpendicularly to the longitudinal direction in operation. Preferably the seat is pivotal relative to the frame about a vertical axis between a first position facing laterally outward in a first substantially perpendicularly direction and a second position facing laterally outward in a second substantially perpendicularly direction opposite the first direction.

When there is provided a drive actuator controlling drive of the vehicle in the longitudinal direction, the drive actuator is preferably positioned adjacent the drive seat for suitable actuation by a leg of the driver.

The engine is preferably supported at an end of the frame beyond the wheels in the longitudinal direction of the vehicle opposite the driver seat for counterbalancing the weight of the operator on the seat.

The seat may be supported on the frame for upward pivotal movement of the seat relative to the frame about a substantially horizontal axis.

When there is provided a drive actuator for controlling drive of the vehicle in the longitudinal direction of the vehicle on the seat from, the drive actuator is preferably movable with the seat relative to the frame.

When there is provided a hitch member supported at a rear end of the vehicle adjacent the seat, the vehicle may be used in combination with a cart including a tub for carrying product therein.

The cart preferably includes a chipper unit for cutting up vegetation into smaller particulate material before being received in the tub.

When the tub includes an open top end, preferably the tub is supported on the cart for pivotal movement into a substantially inverted dumping position.

BRIEF DESCRIPTION OF THE DRAWINGS

In the accompanying drawings, which illustrate an exemplary embodiment of the present invention.

DETAILED DESCRIPTION

Figure 1:
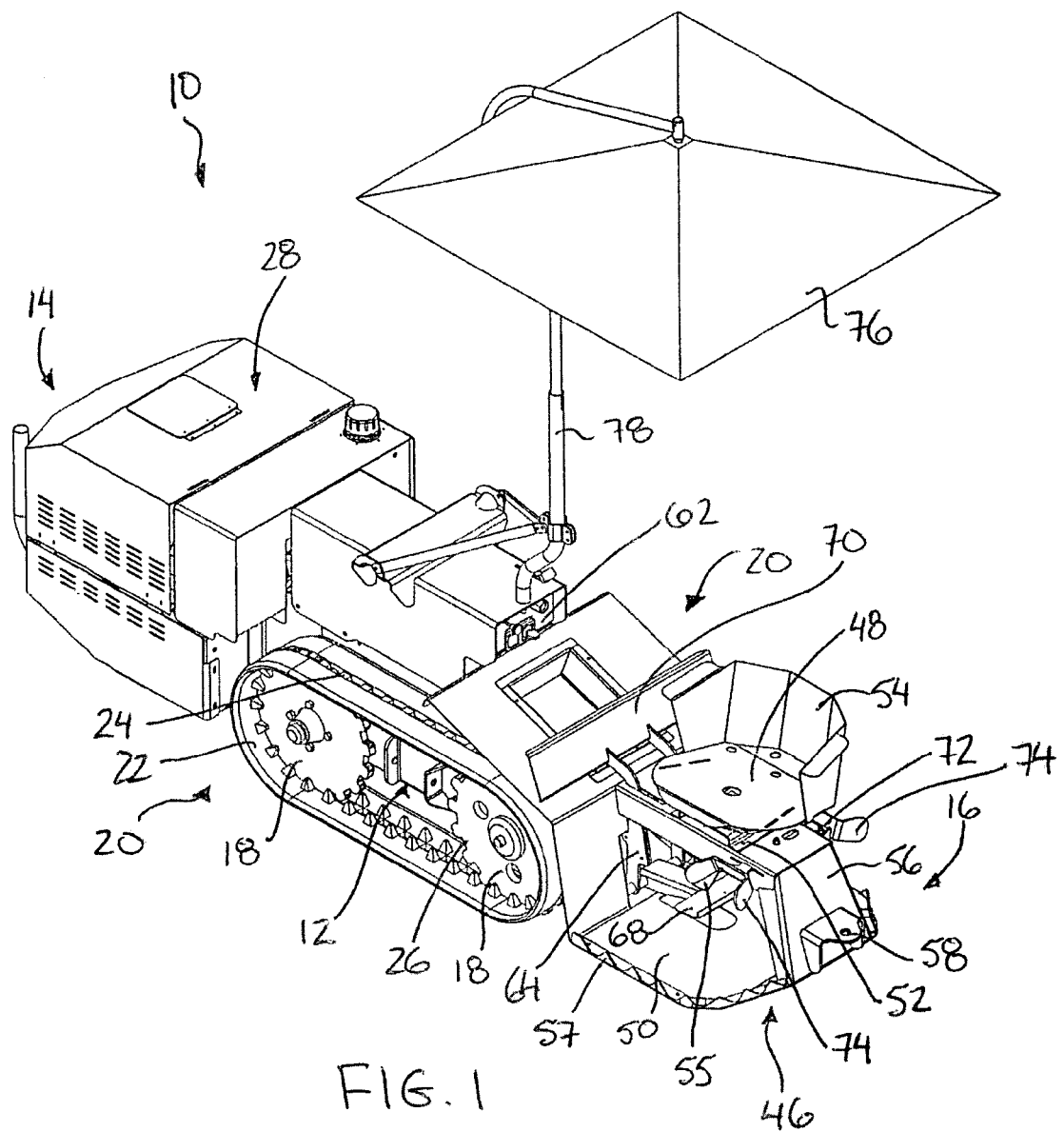
FIG. 1 is a perspective view of the vehicle.
Figure 2:
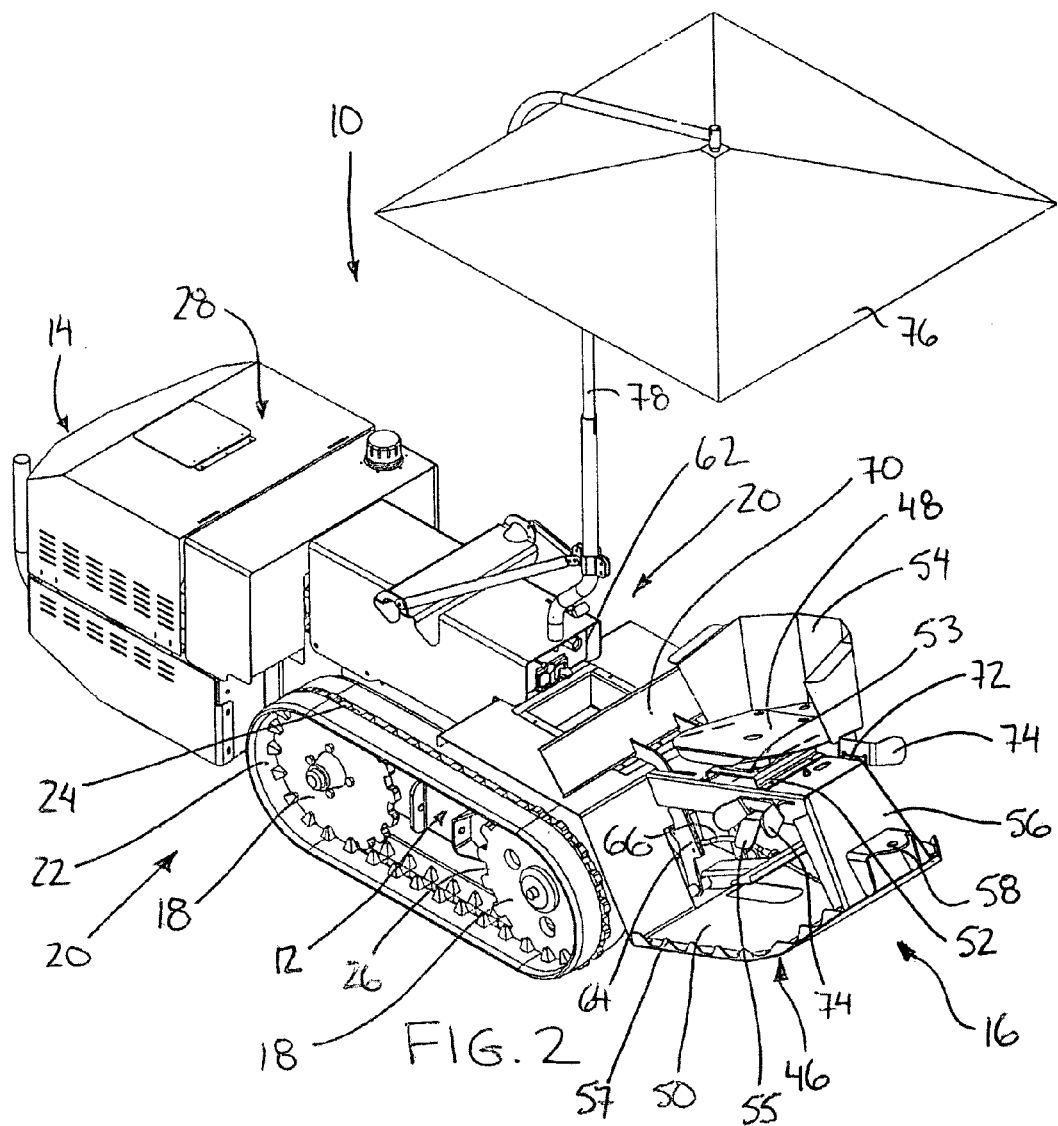
FIG. 2 is a perspective view of the vehicle with the seat frame deflected upwardly in relation to the normal position of FIG. 1.

Referring to the accompanying drawings, there is illustrated a vehicle generally indicated by reference numeral 10. The vehicle generally comprises a personal all terrain vehicle which is well suited for supporting the driver in a low seated position for handling low lying vegetation, for example for pruning grape vines.

The vehicle includes a vehicle frame 12 which is elongate, extending in a longitudinal direction between a front end 14 and a rear end 16. The vehicle frame is surrounded by a main rectangular housing which supports two large track wheels 18 spaced apart from one another on each side 20 of the vehicle. A track 22 formed of pivotally adjoining steel plates with suitable gripping members formed thereon, extends about each pair of wheels 18 on each side 20 of the vehicle.

The track wheels 18 and tracks 22 are similar to many conventional tracks in which an inner surface of the tracks 22 includes a plurality of track bars 24 which mesh with respective slots 26 about a periphery of each track wheel 18. The wheels 18 and track 22 on each side of the vehicle are thus arranged to rotate together for supporting the vehicle frame for rolling movement in a longitudinal direction of the frame.

An engine 28 is mounted on the housing at the front end 14 thereof so as to be positioned spaced outwardly beyond the wheels in the longitudinal direction of the vehicle.

One of the track wheels 18 on each side of the vehicle includes a hydraulic motor 32 coupled to an axle of the wheel to drive rotation of the wheel. The hydraulic motors 32 are coupled to a hydrostatic drive 40 which operates similarly to conventional designs. The hydrostatic drive selectively engages the engine 28 with the wheels 18 in either forward or reverse directions for selectively driving movement of the vehicle in the longitudinal direction by action of the motors 32. The hydraulic motors associated with each track 22 are independently operable to permit only one or both of the tracks 22 to be driven at any given time to provide steering to the vehicle in a skid steer configuration.

A seat frame 46 is pivotally mounted on the rear end 16 of the housing for upward pivotal movement of the seat frame about a horizontal axis relative to the housing. The seat frame 46 positions a seat 48 thereon such that the seat is positioned rearwardly of the wheels spaced outwardly beyond the wheels in the longitudinal direction of the vehicle. The seat frame is pivotally anchored adjacent a top end thereof to the vehicle frame in an abutted relationship. The abutting seat frame 46 and the vehicle frame 12 upon which it is mounted act as a stop mechanism to restrict downward movement of the seat frame relative to the vehicle frame such that only upward movement of the seat frame and seat 48 mounted thereon are permitted relative to the vehicle frame and housing from a horizontal position of the seat relative to the vehicle frame.

The seat frame 46 includes a bottom deck plate 50 which is positioned below a height of the wheel axes substantially below an overall height of the wheels in a normal undeflected position. A seat support structure 52 is mounted on the bottom deck plate 50 for supporting the seat 48 thereon. The seat 48 includes a seating surface substantially at a height of the wheels. The seat support structure permits the seat to be pivotal relative to the frame about a vertical axis between a first position facing laterally outward in a first substantially perpendicularly direction and a second position facing laterally outward in a second substantially perpendicularly direction opposite the first direction. A back rest 54 and associated arms of the seat are fixed with the seating surface to firmly secure a torso of an operator of the vehicle therein for travel over uneven terrain, despite the seat 48 facing laterally outwardly in a sideways configuration, perpendicularly to the forward longitudinal direction of travel of the vehicle in operation in one of the first or second positions noted above.

Figure 3:
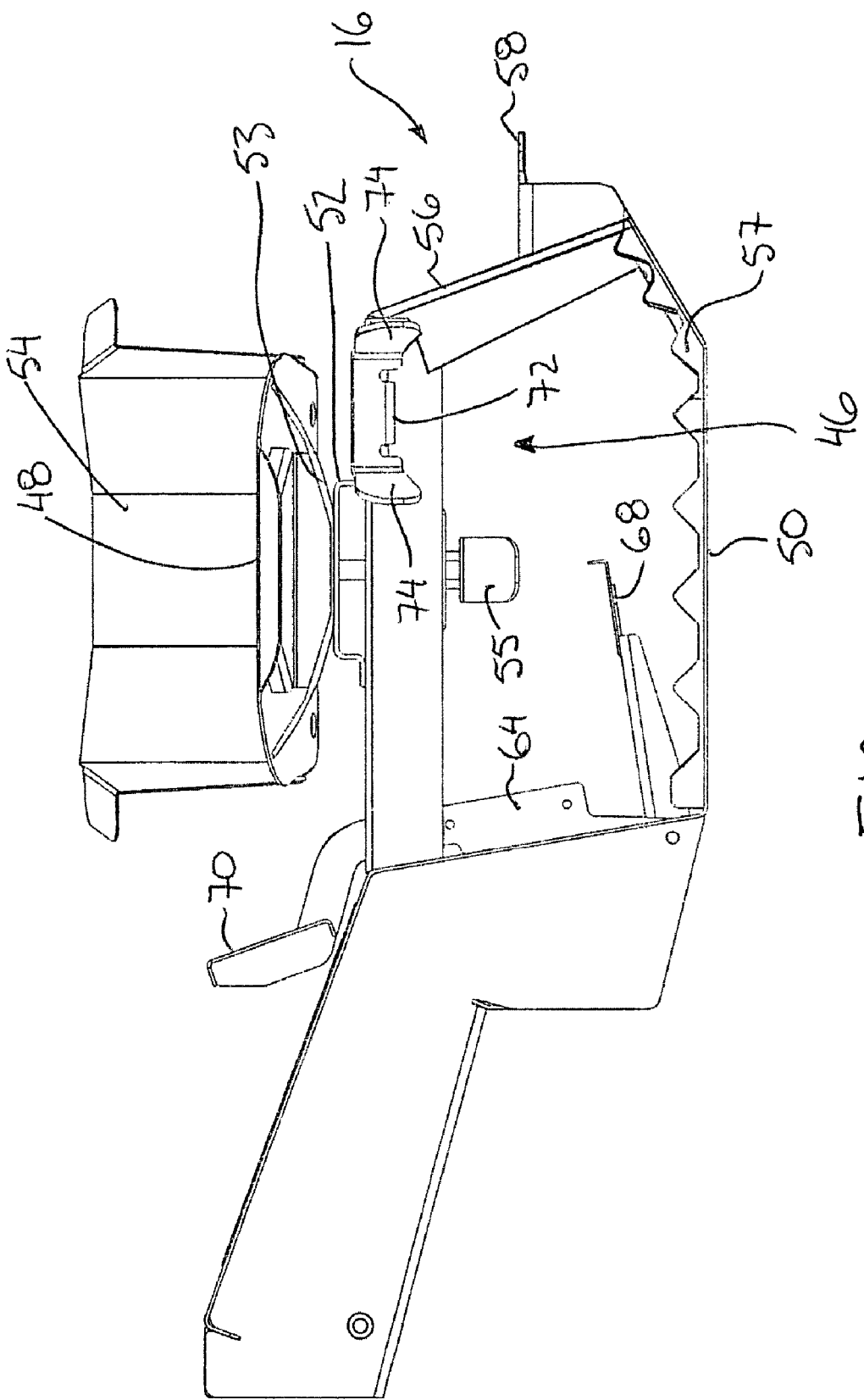
FIG. 3 and FIG. 4 are side elevational views of the seat in respective level and inclined positions.
Figure 4:
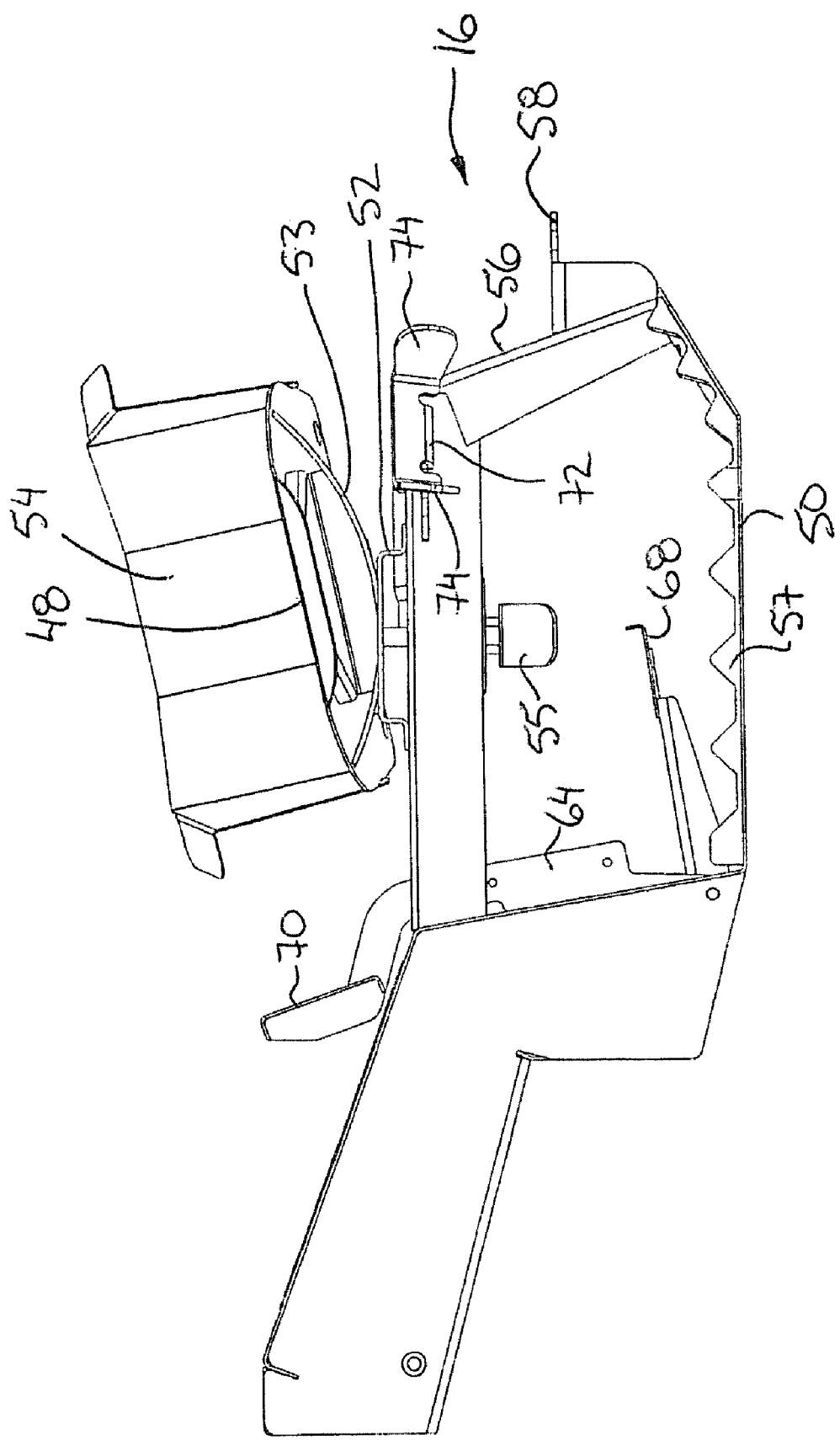
Figure 5:
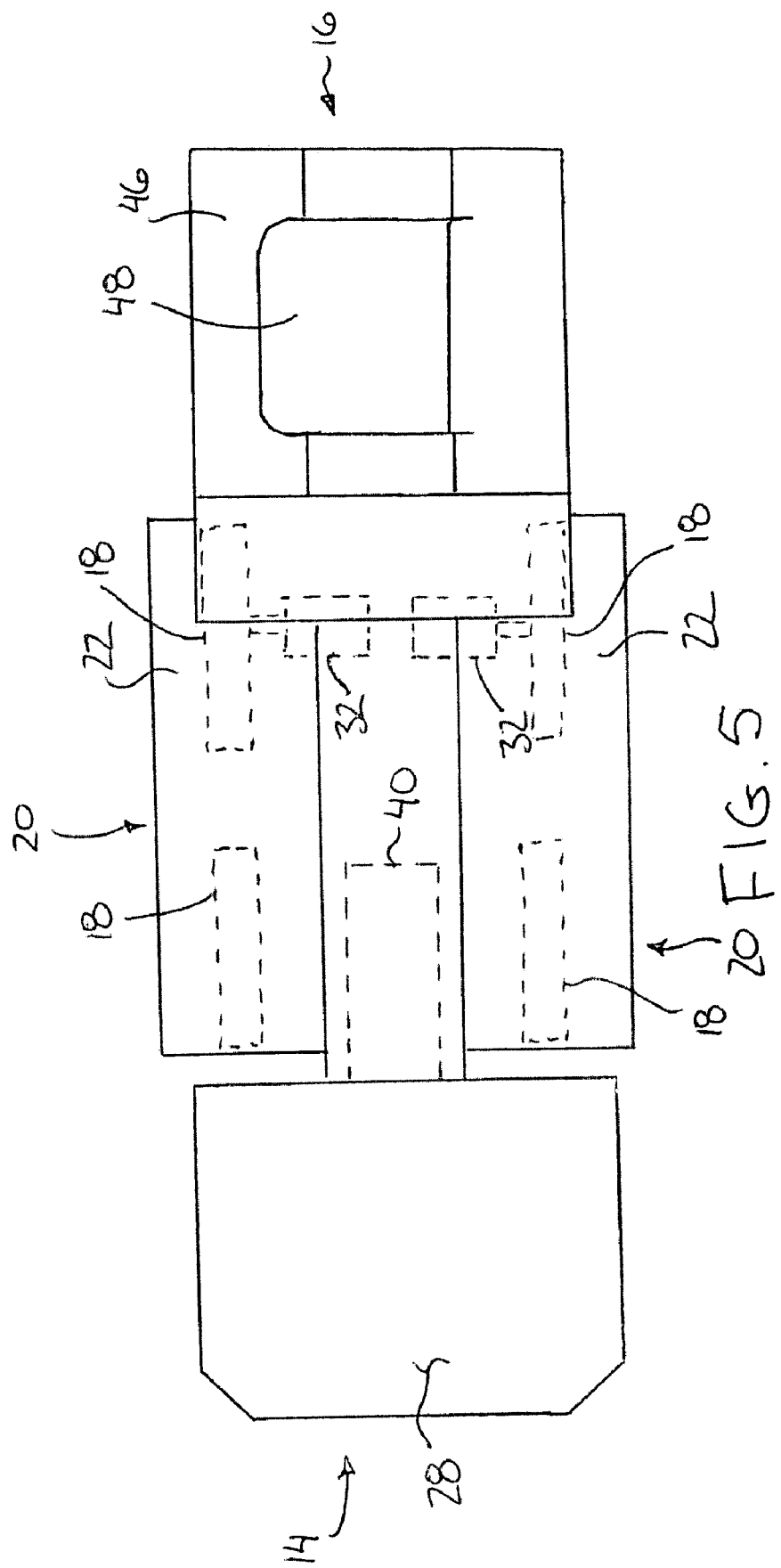
FIG. 5 is a schematic top plan view of the vehicle.
Figure 6:
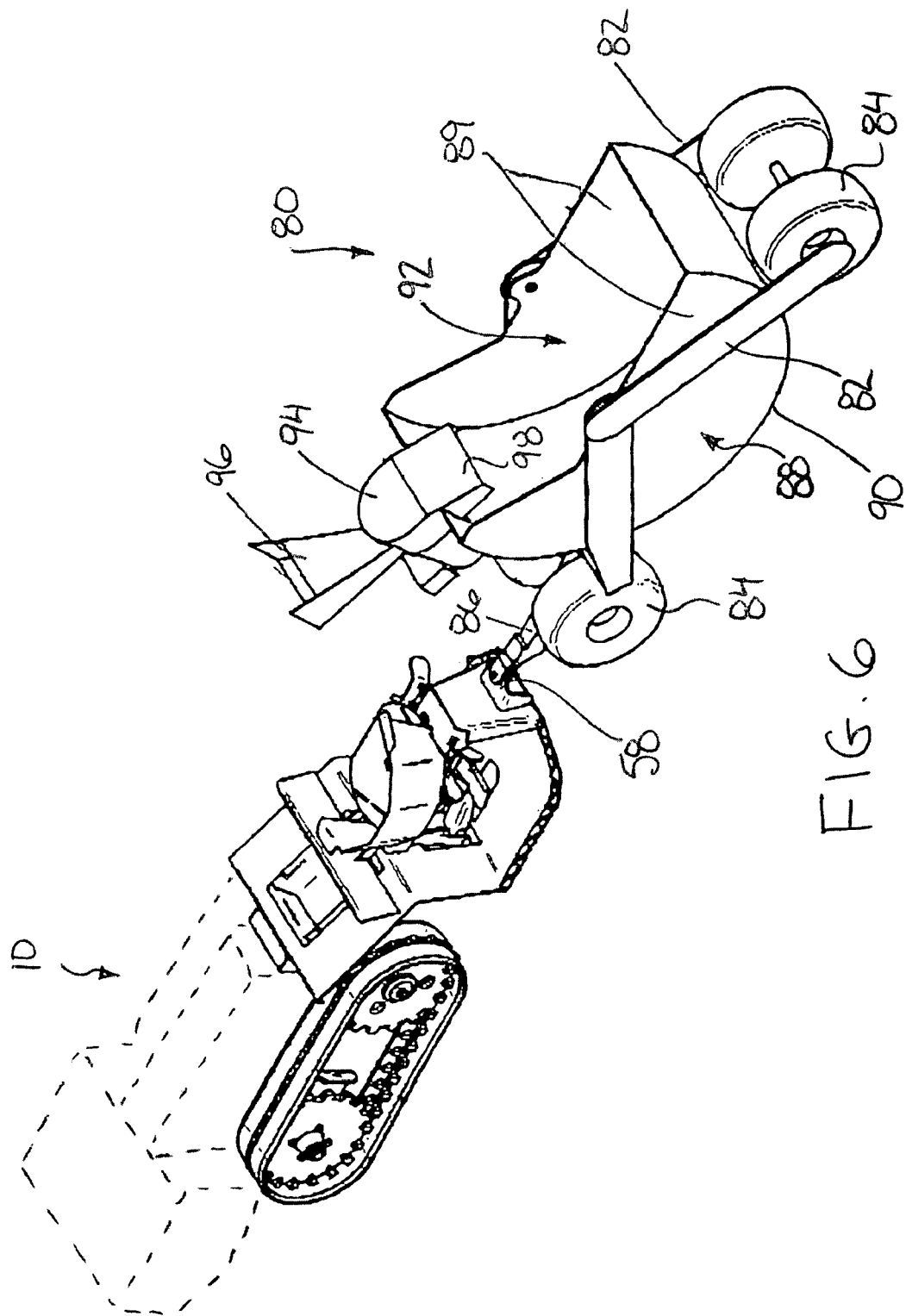
FIG. 6 and FIG. 7 are perspective views of the cart used in combination with the vehicle in a normal position and in an inverted dumping position respectively.

As illustrated in FIGS. 3 and 4, the seat support structure 52 includes a levelling mechanism 53 in the form of a plate which is arched in the longitudinal direction and slidable along the arch of the plate in the longitudinal direction relative to the seat frame whereby the seat can be positioned at various inclinations in relation to the seat frame. A suitable locking lever 55 is provided which can be engaged to lock the seat in a fixed position whereby further rotation or sliding of the seat relative to the seat frame can be restricted.

The seat supporting structure 52 also includes suitable suspension for the seat incorporated therein and positions the seating surface above the bottom deck plate 50 such that the bottom deck plate 50 is suitably positioned for supporting the feet of a driver siting in the driver seat 48. Accordingly, the deck plate 50 includes gripping members 57 formed along a periphery thereof on either side of the vehicle for providing a foot hold for the operator to rest their feet on. The vehicle frame and wheels mounted on each side of the frame are arranged to be sufficiently narrow that the seat overlaps the wheels in a lateral direction so as to be in longitudinal alignment with at least a portion of the track 22 on each side of the vehicle.

The seat frame 46 further includes an end plate 56 which extends upwardly from the free end of the bottom deck plate 50. A hitch 58 projects outwardly from the end plate 56 in the longitudinal direction of the vehicle for attaching the hitch mount of a vehicle to be towed. The end plate and hitch 58 of the seat frame 46 are fixed in relation to the bottom deck plate 50 for pivotal movement with the seat frame relative to the vehicle frame together at the rear end of the vehicle.

An ignition control 62 is provided on the frame of the vehicle 10 so as to be accessible from the seat 48. Drive controls for controlling speed and direction of the vehicle are provided on the seat frame 46 in such a manner that they are pivotal with the seat frame relative to the vehicle frame which supports the engine.

The vehicle is arranged such that the engine power is progressively distributed to the wheels in either forward or reverse directions as determined by a increasing deflection of a throttle lever 64. The throttle lever 64 comprises a hydrostatic control including a flexible hydraulic hose 66 which couples between the hydrostatic drive 40 on the vehicle frame and the throttle lever 64 on the seat frame.

The throttle lever 64 includes a piston which applies pressure to hydraulic fluid in the flexible hose 66 in which position of the piston and accordingly control of the hydrostatic drive 40 is controlled by position of the lever 64. A set of pedals 68 are supported above the deck plate 50 of the seat frame on either side of the vehicle below the seat 48 so as to be readily accessible for stepping on by an operator seated in the seat 48. Downward motion on the pedals 68 from either side of the vehicle causes deflection of the throttle lever 64 to drive the vehicle in a rearward direction with the seat 48 being at a leading end of the vehicle in the rearward direction.

A movable panel 70 is supported on the seat frame to span laterally across a width of the vehicle adjacent the seat 48. The panel is coupled to the throttle lever 64 for movement therewith whereby depressing the panel 70 inward towards the vehicle frame causes the lever 64 to be displaced in such a manner that the vehicle is driven forward with the seat 48 is positioned at a trailing end of the forward motion. The lever 64 is a progressive control whereby the amount of deflection of the lever by the pedals 68 in the rearward direction or the panel 70 in the opposing forward direction is directly proportional to the speed of the vehicle.

Steering is provided by a steering lever 72 which is pivotally mounted at its centre below the seat 48 to extend laterally outwardly in both directions. A pair of paddles 74 are mounted at spaced positions at each end of the lever 72 in which the paddles 74 are suitably spaced for receiving the leg of an operator seated in the seat 48 therebetween.

The steering lever 72 is similarly connected to the hydrostatic drive 40 of the vehicle in a manner so as to not interfere with pivotal movement of the seat frame relative to the vehicle frame. In an undeflected position, the steering lever 72 is oriented perpendicularly to the longitudinal direction of the vehicle for driving the vehicle straight in the longitudinal direction by providing equal drive to both tracks 22. Deflecting the lever 72 from the straight position in either right or left inclined position permits drive to the tracks 22 to be progressively distributed to a respective one of the tracks more than the other track to operate steering in a typical skid steer configuration.

Both the paddles for steering and the pedals 68 and panel 70 for drive are accessible from both sides of the vehicle for easy operation of the vehicle in either right side or left side configurations of the seat.

A canopy 76 is supported above the seat by a post 78 which extends upwardly from the frame of the vehicle. Suitable bracing is provided between the post and the frame of the vehicle.

A cart 80 may be provided coupled to the hitch 58 at the rear end 16 of the vehicle adjacent the seat 48. The cart 80 includes a longitudinally extending frame comprising two elongate side members 82 extending in a longitudinal direction of the cart at spaced apart positions. Wheels 84 are provided at front and rear ends of the frame which are substantially equal in width to the overall width of the vehicle 10.

A hitch tongue 86 is secured to the frame 80 to project forwardly therefrom for connection to the hitch 58 of the vehicle 10. The hitch tongue 86 is permitted to move relative to the frame of the cart to accommodate for pivotal deflection of the seat frame relative to the vehicle 10.

A tub 88 is provided on the cart, pivotally mounted on the frame between the side members 82. The tub comprises two parallel side walls 89 and a semicircular bottom wall 90 spanning the side walls. The tub is pivotal about a central axis of the semi circular bottom which extends horizontally in a lateral direction between the opposed side members 82 spaced above the ground.

An open top end 92 of the tub receives clippings from a chipper unit 94 supported on the frame of the cart between the tub and the hitch tongue 86. The chipper unit includes a feed chute 96 projecting forwardly towards the seat 48 of the vehicle above the hitch 58 to permit an operator in the seat of the vehicle to readily place clippings into the feed chute within an arms reach. The chipper unit 94 includes a dispensing chute 98 projecting into the open top 92 of the tub 88 whereby the clippings are cut up into smaller pieces for more compact storage within the tub 88.

Figure 7:
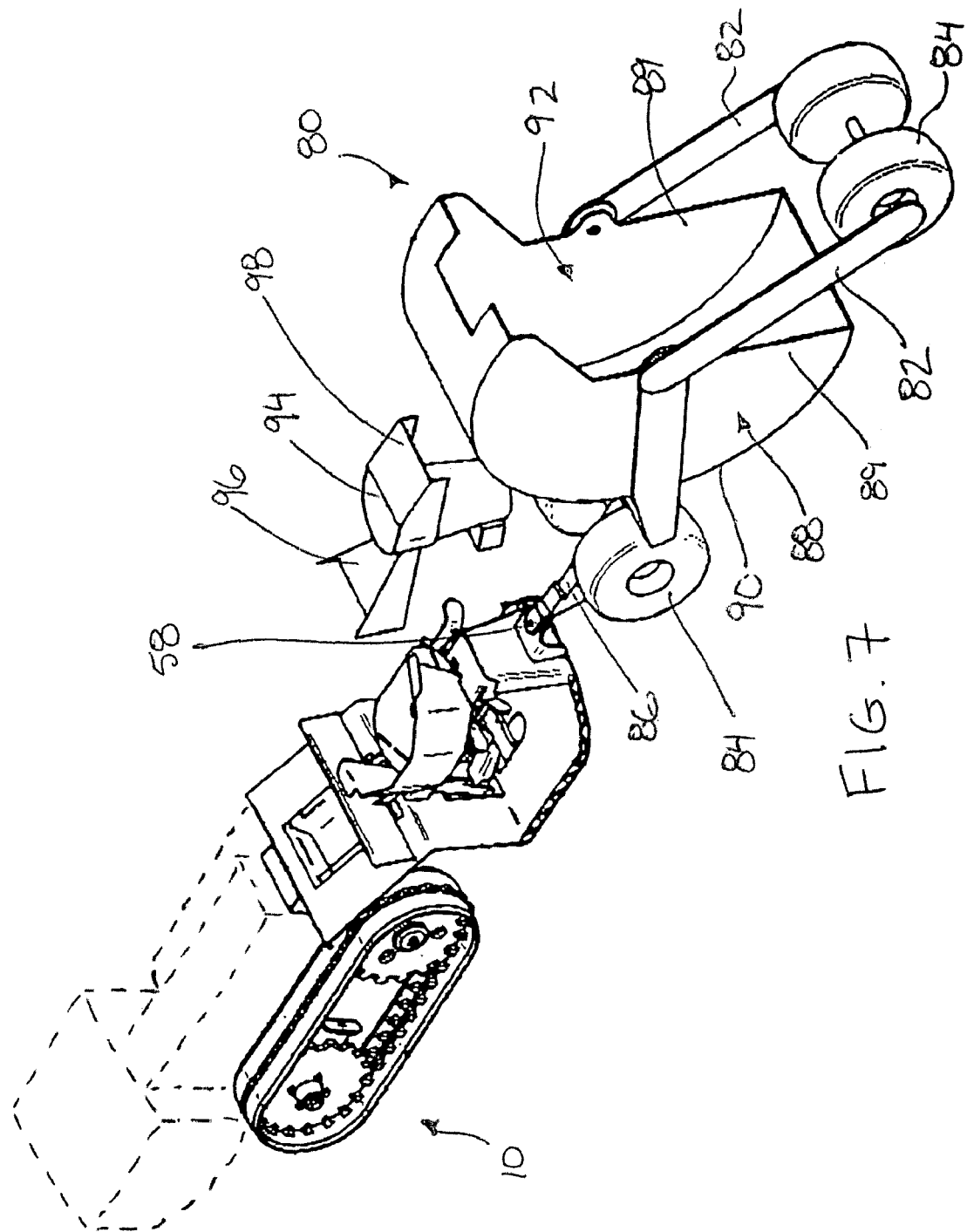

When the tub is nearly full of clippings, the tub may be pivoted about its horizontal axis into a partially inverted position in which the open top end 92 faces partly downwardly. The chipper unit 94 is pivotally mounted on the frame to permit pivotal movement of the unit forwardly away from the tub during movement of the tub into the dumping position as illustrated in FIG. 7.

The cart is coupled to the electrical system of the vehicle 10 for driving the chipper with electrical power from the alternator of the vehicle 10.

In further embodiments, direction of the vehicle may be reversed such that the seat is instead positioned at the forward end with the engine again being positioned opposite the seat to act as a counterbalance to the weight of the driver. When the seat is positioned at the end of the vehicle beyond the wheels it remains desirable to permit the seat to be deflected upwardly, however this may be accomplished by a slide configuration or a suitable parallel linkage and the like. Also in further embodiments, the track may be replaced with any suitable all terrain type wheeled drive for example a set of four large all terrain wheels which are configured for all-wheel drive or different types of tracks may be used including hinged metal plates or rubber and the like. In addition to leg actuation of the drive controls, other controls such as steering or throttle may also be provided with leg actuated levers on the seat frame.

As described above, the seat may be pivotally supported relative to the seat frame for rotation about an upright axis to reorient the seat to face sideways in the opposite direction to the one illustrated herein. The vehicle may thus be operated in either left or right hand modes by providing steering and drive controls accessible from both sides of the vehicle. Alternatively, the seat and drive controls may be supported by threaded fasteners and the like so as to permit mounting on the seat frame in either right or left hand modes of operation. The seat frame may further include additional seating for supporting two or more persons thereon, with the additional seating also preferably being oriented to face laterally outward, generally perpendicularly to the forward travelling direction of the vehicle. When additional seating is provided, the seats are preferably all secured on the seat frame for movement with the seat frame relative to the housing between the normal and deflected positions noted above.

While various embodiments of the present invention have been described in the foregoing, it is to be understood that other embodiments are possible within the scope of the invention. The invention is to be considered limited solely by the scope of the appended claims.

The invention claimed is:

1. A personal all-terrain vehicle comprising:
   a frame supported for rolling movement along the ground on respective wheels;
   an engine arranged for driving the wheels to displace the vehicle in a longitudinal direction of the vehicle; and
   a driver seat supported on the frame and arranged for supporting a driver of the vehicle thereon;

the driver seat being positioned at an end of the frame beyond the wheels of the vehicle in the longitudinal direction of the vehicle;

wherein there is provided a track extending about respective ones of the wheels on each side of the frame; and wherein the seat includes a deck below a seating surface of the seat and arranged for supporting feet of the driver thereon, the deck being positioned below a height of the tracks.

2. The vehicle according to claim 1 wherein the seat is supported directly in behind the wheels, in alignment in the longitudinal direction with the wheels.

3. The vehicle according to claim 1 wherein orientation of the driver seat faces laterally outward, substantially perpendicularly to the longitudinal direction in operation.

4. The vehicle according to claim 3 wherein the seat is pivotal relative to the frame about a vertical axis between a first position facing laterally outward in a first substantially perpendicular direction relative to the longitudinal direction and a second position facing laterally outward in a second substantially perpendicular direction relative to the longitudinal direction and opposite the first direction.

5. The vehicle according to claim 1 wherein there is provided a drive actuator controlling drive of the vehicle in the longitudinal direction, the drive actuator being positioned adjacent the drive seat for suitable actuation by a leg of the driver.

6. The vehicle according to claim 1 wherein the engine is supported at an end of the frame beyond the wheels in the longitudinal direction of the vehicle opposite the driver seat.

7. The vehicle according to claim 1 wherein the seat is supported on the frame for upward pivotal movement of the seat relative to the frame about a substantially horizontal axis.

8. The vehicle according to claim 7 wherein there is provided a drive actuator for controlling drive of the vehicle in the longitudinal direction of the vehicle, the drive actuator being movable with the seat relative to the frame.

9. The vehicle according to claim 1 wherein there is provided a hitch member supported at a rear end of the vehicle adjacent the seat.

10. A personal all-terrain vehicle comprising:

a frame;

wheels supporting the frame for rolling movement along the ground;

a track extending about respective ones of the wheels on each side of the frame;

an engine arranged for driving the wheels to displace the vehicle in a longitudinal direction of the vehicle;

a driver seat supported on the frame and arranged for supporting a driver of the vehicle thereon;

the driver seat being positioned at an end of the frame beyond the wheels of the vehicle in the longitudinal direction of the vehicle and in alignment in the longitudinal direction with the wheels;

the driver seat being pivotal relative to the frame about a vertical axis between a first position facing laterally outward in a first direction oriented substantially perpendicular to the longitudinal direction and a second position facing laterally outward in a second direction substantially perpendicular to the longitudinal direction and opposite the first direction;

the driver seat being supported on the frame for movement of the seat in an upward direction relative to the frame;

the driver seat including a seating surface and a deck below the seating surface, the deck being arranged for supporting feet of a driver in the seat thereon and being positioned below a height of the tracks;

a drive actuator arranged to control drive of the vehicle by the engine in the longitudinal direction;

the drive actuator being positioned adjacent the driver seat so as to be arranged for actuation by a leg of a driver in the driver seat;

the drive actuator being movable with the seat relative to the frame in the upward direction.

11. The vehicle according to claim 10 wherein the seat includes a deck below a seating surface of the seat and arranged for supporting feet of the driver thereon, the deck being positioned below a height of the tracks.

12. A personal all-terrain vehicle comprising:

a frame supported for rolling movement along the ground on respective wheels;

an engine arranged for driving the wheels to displace the vehicle in a longitudinal direction of the vehicle; and a driver seat supported on the frame and arranged for supporting a driver of the vehicle thereon;

the driver seat being positioned at an end of the frame beyond the wheels of the vehicle in the longitudinal direction of the vehicle;

wherein orientation of the driver seat faces laterally outward, substantially perpendicularly to the longitudinal direction in operation; and wherein the seat is pivotal relative to the frame about a vertical axis between a first position facing laterally outward in a first substantially perpendicular direction relative to the longitudinal direction and a second position facing laterally outward in a second substantially perpendicular direction relative to the longitudinal direction and opposite the first direction.

13. The vehicle according to claim 12 wherein there is provided a track extending about respective ones of the wheels on each side of the frame.

14. The vehicle according to claim 12 wherein the engine is supported at an end of the frame beyond the wheels in the longitudinal direction of the vehicle opposite the driver seat.

15. The vehicle according to claim 12 wherein the seat is supported on the frame so as to be arranged for upward pivotal movement of the seat relative to the frame about a substantially horizontal axis.

16. The vehicle according to claim 12 wherein the seat includes a deck below a seating surface of the seat and arranged for supporting feet of the driver thereon, the deck being positioned below a height of the tracks.

17. A personal all-terrain vehicle comprising:

a frame supported for rolling movement along the ground on respective wheels;

an engine arranged for driving the wheels to displace the vehicle in a longitudinal direction of the vehicle; and a driver seat supported on the frame and arranged for supporting a driver of the vehicle thereon;

the driver seat being positioned at an end of the frame beyond the wheels of the vehicle in the longitudinal direction of the vehicle;

wherein the engine is supported at an end of the frame beyond the wheels in the longitudinal direction of the vehicle opposite the driver seat; and wherein the seat is supported on the frame so as to be arranged for upward pivotal movement of the seat relative to the frame about a substantially horizontal axis.

18. A personal all-terrain vehicle comprising:

a frame supported for rolling movement along the ground on respective wheels;

an engine arranged for driving the wheels to displace the vehicle in a longitudinal direction of the vehicle; and a driver seat supported on the frame and arranged for supporting a driver of the vehicle thereon;

the driver seat being positioned at an end of the frame beyond the wheels of the vehicle in the longitudinal direction of the vehicle;

wherein the seat is supported on the frame so as to be arranged for upward pivotal movement of the seat relative to the frame about a substantially horizontal axis.

19. The vehicle according to claim 18 wherein there is provided a drive actuator for controlling drive of the vehicle in the longitudinal direction of the vehicle, the drive actuator being movable with the seat relative to the frame.

20. The vehicle according to claim 18 wherein the seat includes a deck below a seating surface of the seat and arranged for supporting feet of the driver thereon, the deck being positioned below a height of the tracks.

* * * * *